United States Patent
Nakamura et al.

(10) Patent No.: US 9,979,278 B1
(45) Date of Patent: May 22, 2018

(54) POWER SUPPLY DEVICE

(71) Applicant: TOYOTA JIDOSHA KABUSHIKI KAISHA, Toyota-shi, Aichi (JP)

(72) Inventors: Tomohiro Nakamura, Miyoshi (JP); Yuta Kojima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/698,014

(22) Filed: Sep. 7, 2017

(30) Foreign Application Priority Data

Nov. 2, 2016 (JP) .................. 2016-215614

(51) Int. Cl.
| | |
|---|---|
| *G05F 5/00* | (2006.01) |
| *H02M 3/156* | (2006.01) |
| *H02M 1/38* | (2007.01) |
| *H02M 7/217* | (2006.01) |
| *G05F 1/569* | (2006.01) |
| *H02M 1/32* | (2007.01) |
| *H02M 1/00* | (2006.01) |

(52) U.S. Cl.
CPC ............. *H02M 1/38* (2013.01); *H02M 7/217* (2013.01); *H02M 2001/0038* (2013.01)

(58) Field of Classification Search
CPC ........... F02N 11/087; F02N 2011/0874; F02N 2011/0877; F02N 2011/0888; F02N 2011/0848; G05F 5/00; G05F 1/56; G05F 1/565; G05F 1/569; H02M 1/32; H02M 1/36; H02M 3/156
See application file for complete search history.

(56) References Cited

U.S. PATENT DOCUMENTS

| | | | | |
|---|---|---|---|---|
| 4,091,432 A | * | 5/1978 | Muller .................... | G05F 1/461 323/304 |
| 4,679,111 A | * | 7/1987 | Koch .................... | G01R 31/346 361/31 |
| 5,929,535 A | * | 7/1999 | Fendt .................... | B60R 21/017 180/268 |
| 6,347,030 B1 | * | 2/2002 | Matsuura ................. | H02H 7/18 307/10.6 |
| 6,999,867 B2 | * | 2/2006 | Konno .................... | F02D 41/26 307/10.2 |

(Continued)

FOREIGN PATENT DOCUMENTS

| | | |
|---|---|---|
| JP | H09-322432 A | 12/1997 |
| JP | 2003-079069 A | 3/2003 |

*Primary Examiner* — Gary L Laxton
(74) *Attorney, Agent, or Firm* — Oliff PLC

(57) ABSTRACT

A power supply device may include a first power line configured to connect a power source to a load via a relay, at least one diode disposed on the first power line between the relay and the load, a second power line disposed in parallel with the first power line and configured to connect the power source to the load via a switching element, and a controller configured to control on and off of the switching element. A voltage drop that occurs across the switching element when the switching element is turned on is smaller than a voltage drop that occurs across the at least one diode when the relay is turned on. The controller is configured to determine whether the switching element is on or off based on a voltage across the at least one diode and a voltage supplied to the load.

7 Claims, 3 Drawing Sheets

(56) References Cited

U.S. PATENT DOCUMENTS 8,373,373 B2 * 2/2013 Vanweelden ............. H02P 1/44
200/82 DA
2009/0323241 A1 * 12/2009 Harb ..................... H02H 3/20
361/91.2

* cited by examiner

POWER SUPPLY DEVICE

TECHNICAL FIELD

A technique disclosed herein relates to a power supply device.

BACKGROUND

Japanese Patent Application Publication No. 2003-079069 discloses a power supply device which supplies electric power from a power source to a load. This kind of power supply device is configured to connect the power source and the load via a switching element.

According to such a configuration, the power source and the load can be electrically connected by turning on the switching element, and the power source and the load can be electrically disconnected by turning off the switching element.

SUMMARY

In a power supply device, a failure may occur in its switching element. When an on-failure occurs in the switching element, a power source and a load cannot be electrically disconnected and, for example, electric power is unnecessarily supplied to the load from the power source. When an off-failure occurs in the switching element, the power source and the load cannot be electrically connected, and the electric power cannot be supplied to the load from the power source. Here, the on-failure of the switching element means a failure where the switching element is maintained to be turned on regardless of a command signal to the switching element, for example. The off-failure of the switching element means a failure where the switching element is maintained to be turned off regardless of a command signal to the switching element, for example.

Given the above, the present disclosure presents a technique of detecting a failure of a switching element in a power supply device.

According to one aspect of the present technique, a power supply device is disclosed. The power supply device is configured to supply electric power from a power source to a load. The power supply device may comprise a first power line configured to connect the power source to the load via a relay, at least one diode disposed on the first power line between the relay and the load, a second power line disposed in parallel with the first power line and configured to connect the power source to the load via a switching element, and a controller configured to control on and off of the switching element. A voltage drop that occurs across the switching element when the switching element is turned on is smaller than a voltage drop that occurs across the at least one diode when the relay is turned on. Further, the controller is configured to determine whether the switching element is on or off based on a voltage across the at least one diode and a voltage supplied to the load.

In the above-described power supply device, if the switching element is off when the relay is turned on, the electric power is supplied via the first power line from the power source to the load. In this case, the voltage drop occurs across the at least one diode. Therefore, the controller can determine whether the switching element is on or not based on the voltage across the at least one diode. Thereafter, when the switching element is switched from off to on, the electric power is supplied from the power source to the load via the second power line, instead of the first power line, and a voltage supplied to the load rises. This is because the voltage drop that occurs across the switching element is smaller than the voltage drop that occurs across the at least one diode. Therefore, the controller can recognize that the switching element has been turned on based on a magnitude of the voltage supplied to the load or a change in the voltage supplied to the load. As described above, the controller can determine whether the switching element is on or off, and detect a failure of the switching element by comparing the determination result to a command which the controller provides to the switching element.

DETAILED DESCRIPTION

Figure 1:
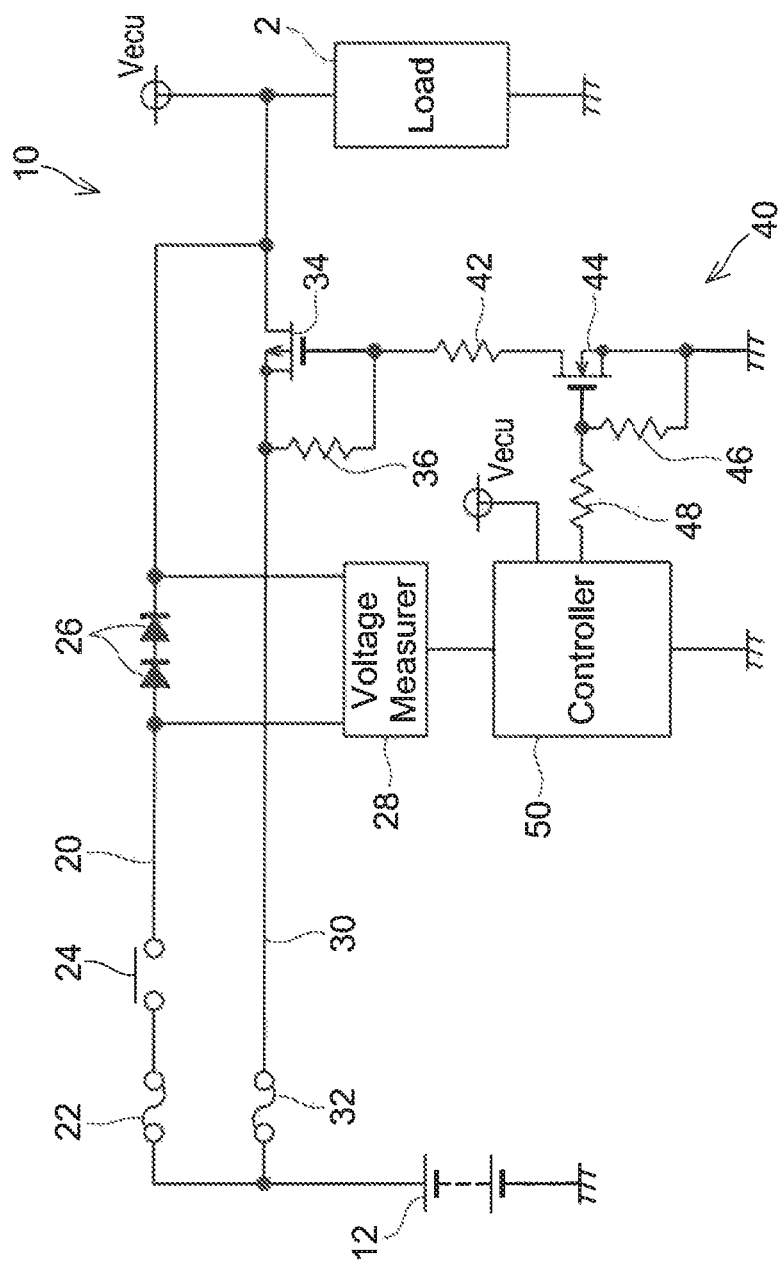
FIG. 1 is a circuit block diagram showing a configuration of a power supply device 10.

In one aspect of the present technique, the power supply device may further comprise a voltage measurer configured to output a signal corresponding to the voltage across the at least one diode to the controller. According to such a configuration, the voltage drop occurring across the at least one diode can be accurately detected. In another aspect, however, outermost terminals of the at least one diode may be directly connected to the controller, for example, by the controller including an appropriate interface, and the controller may be able to detect the voltage across the at least one diode.

In one aspect of the present technique, the controller may be configured to determine that the switching element is off when the voltage across the at least one diode is within a predetermined range. As aforementioned, the electric power is supplied via the first power line from the power source to the load when the switching element is off and thus the voltage drop occurs across the at least one diode. Contrary to this, when the switching element is on, the electric power is supplied via the second power line from the power source to the load, and no current flows in the first power line. This is because the voltage drop that occurs across the switching element is smaller than the voltage drop that occurs across the at least one diode. Therefore, when the voltage across the at least one diode is within the predetermined range, the controller can determine that the switching element is off by recognizing that the voltage drop is occurring across the at least one diode. In another aspect, however, the controller may determine that the switching element is turned off, for example, according to a change in the voltage across the at least one diode. In this case, the controller may provide the switching element with a test command for turning on or turning off.

In one aspect of the present technique, the controller may be configured to determine that the switching element is turned on when the voltage supplied to the load rises at least by a predetermined amount after the controller has provided the switching element with a command for turning on. As aforementioned, when the switching element is switched from off to on, the voltage supplied to the load rises. Therefore, when the voltage supplied to the load rises at least by the predetermined amount after the controller has provided the switching element with the command for turning on, the controller can determine that the switching element has actually been turned on. In another embodiment, however, the controller may determine that the switching element is turned on, for example, according to a magnitude of the voltage supplied to the load.

In one aspect of the present technique, the power source may be a DC (direct-current) power source, and the DC power source may include one or more secondary battery cells.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved power supply devices, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Referring to the drawings, a power supply device 10 of an embodiment will be described. The power supply device 10 is configured to electrically connect a power source 12 and a load 2, and to supply electric power from the power source 12 to the load 2. The power supply device 10 of the present embodiment is mainly mounted on an automobile, the power source 12 is, for example, a battery including a plurality of secondary battery cells, and the load 2 is, for example, an electronic control unit. A rated voltage of the power source 12 is 12 volts, although not limited thereto. It should be noted that an application of the power supply device 10 is not specifically limited. The power source 12 may be a DC power source or an AC (alternating-current) power source. If the power source 12 is an AC power source, the power supply device 10 can further comprise an AC-DC converter configured to convert AC power from the AC power source to DC power. In this case, the AC-DC converter can be provided between a first power line 20 and a second power line 30 to be described later and the power source 12.

The power supply device 10 further comprises the first power line 20. The first power line 20 connects the power source 12 to the load 2 via a relay 24. The relay 24 is turned on and off by user operations or based on commands from another device. The relay of the present embodiment is turned on when a user operates a start-up switch of the automobile (not shown) and is turned off when the user releases the operation of the start-up switch, although this is merely an example. It should be noted that the start-up switch of automobile may be referred to as an ignition switch, regardless of existence or absence of an engine. When the relay 24 is turned on, the power source 12 is connected to the load 2 via the first power line 20. When the relay 24 is turned off the first power line 20 is electrically disconnected. A fuse 22 is connected between the power source 12 and the relay 24.

Two diodes 26 are provided on the first power line 20. The two diodes 26 are located between the relay 24 and the load 2. The two diodes 26 are connected to each other in series and in a same orientation, and an anode of one of the two diodes 26 is connected to the relay 24 and a cathode of the other one of the two diodes 26 is connected to the load 2. It should be noted that other electron element or electron device may intervene, if needed, between the two diodes 26 and the relay 24, as well as between the two diodes 26 and the load 2. Although the diodes 26 in the present embodiment are diodes including a pn junction (so-called pn junction diodes), configurations of the diodes 26 are not specifically limited.

When a current flows in the first power line 20, a voltage drop occurs in each of the diodes 26. A forward voltage of each diode 26 is 0.7 volts, although this is merely an example. The forward voltage used herein means a minimum voltage that allows the current to flow in each diode 26 when a voltage in a forward direction is applied thereto. Due to a characteristic of the diodes 26, a voltage drop substantially equal to the forward voltage occurs in each diode 26, regardless of a magnitude of the current flowing in the first power line 20. That is, in the present embodiment, the voltage drop of 1.4 volts in total occurs across the two diodes 26 when the current flows in the first power line 20. As a result, a supplied voltage $V_{ecu}$ to the load 2 is decreased by at least 1.4 volts from a direct voltage from the power source 12 (e.g., 12 volts). In other embodiments, one diode 26 may be provided, or alternatively, three or more diodes 26 may be provided.

The power supply device 10 comprises a voltage measurer 28. The voltage measurer 28 is connected to outermost terminals of the two diodes 26 and is configured to output a signal corresponding to a voltage across the two diodes 26. The voltage measurer 28 can be constituted using a publicly known differential amplifier circuit. A measurement signal outputted by the voltage measurer 28 is inputted to a controller 50 to be described later. It should be noted that the voltage measurer 28 is not necessarily needed, if the controller 50 includes an appropriate interface and can directly detect the voltage across the two diodes 26.

The power supply device 10 comprises the second power line 30. The second power line 30 is disposed in parallel with the first power line 20. The second power line 30 connects the power source 12 to the load 2 via a switching element 34. The switching element 34 in the present embodiment is a power semiconductor element, specifically it is a p-type MOSFET (Metal-Oxide-Semiconductor Field-Effect Transistor). A source of the switching element 34 is connected to the power source 12 via a fuse 32, and a drain of the switching element 34 is connected to the load 2. Further, the source and a gate of the switching element 34 are connected to each other via a resistor 36. It should be noted that the switching element 34 is not limited to the p-type MOSFET, and may be other power semiconductor element such as an n-type MOSFET, an IGBT (Insulated-Gate Bipolar Transistor), or the like. When the switching element 34 is tuned on, the power source 12 is connected to the load 2 via the second power line 30. When the switching element 34 is turned off, the second power line 30 is electrically disconnected.

When the current flows in the second power line 30, a voltage drop occurs in the switching element 34. An on-resistance of the switching element 34 is 50 mΩ, and a voltage drop of 0.25 volts occurs in the switching element 34 when a current of 5 A flows in the switching element 34, although this is merely an example. In this case, the supplied voltage $V_{ecu}$ to the load 2 is decreased by at least 0.25 volts from the direct voltage from the power source 12 (e.g., 12 volts). Compared to the aforementioned two diodes 26, the voltage drop occurring across the switching element 34 (e.g., 0.25 volts) when the switching element 34 is turned on is smaller than the voltage drop occurring across the two diodes 26 (e.g., 1.4 volts) when the relay 24 is turned on. Although no specific numerical limitation is placed, according to such a magnitude relationship, the supplied voltage $V_{ecu}$ to the load 2 is larger when electrical power is supplied through the second power line 30 than through the first power line 20.

The power supply device 10 comprises the controller 50. The controller 50 is constituted using a microcomputer, for example. The controller 50 is connected to the switching element 34 and is configured to control the on and off of the switching element 34. The controller 50 in the present embodiment is connected to the gate of the switching element 34, which is the MOSFET, via a drive circuit 40. The drive circuit 40 includes a second switching element 44 and plural resistors 42, 46, and 48. The second switching element 44 is an n-type MOSFET, although not limited thereto. A gate of the second switching element 44 is connected to the controller 50 via the resistor 48. A drain of the second switching element 44 is connected to the gate of the switching element 34 via the resistor 42. A source of the second switching element 44 is connected to a ground (i.e., negative electrode of the power source 12). Further, the gate and the source of the second switching element 44 are connected to each other via the resistor 46.

The controller 50 outputs a command signal to the drive circuit 40 to turn the switching element 34 on and off. The controller 50 outputs a high-level command signal to turn on the switching element 34 and a low-level command signal to turn off the switching element 34, although not specifically limited as such. The command signals are inputted to the second switching element 44 through the resistor 48. If the command signal is high level, the second switching element 44 is turned on, and the switching element 34 is thereby turned on. If the command signal is low level, the second switching element 44 is turned off and the switching element 34 is thereby turned off as well. It should be noted that the operational aspect described herein is merely an example and it does not limit an operational aspect of the controller 50. Various modifications can be added to the operational aspect of the controller 50, depending to configurations of the controller 50 and the drive circuit 40.

Similarly to the load 2, the controller 50 operates by the electric power supplied from the power source 12 through the first power line 20 or the second power line 30. That is, the supplied voltage $V_{ecu}$ is applied to the controller 50 as well, similarly to the load 2. In this regard, the controller 50 can be construed as a part of the load 2.

Figure 2:
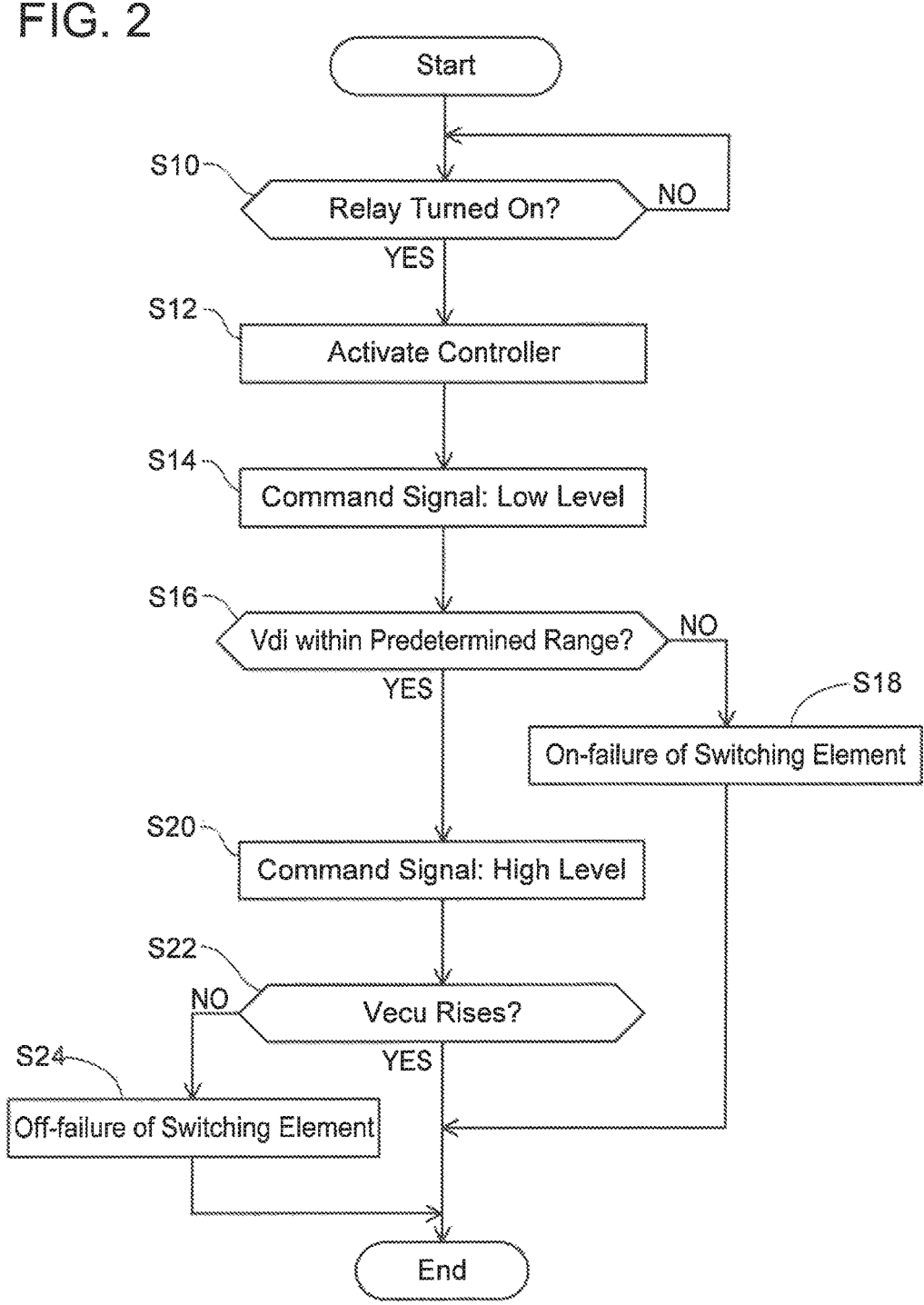
FIG. 2 is a flowchart showing a typical operation flow of the power supply device 10.
Figure 3:
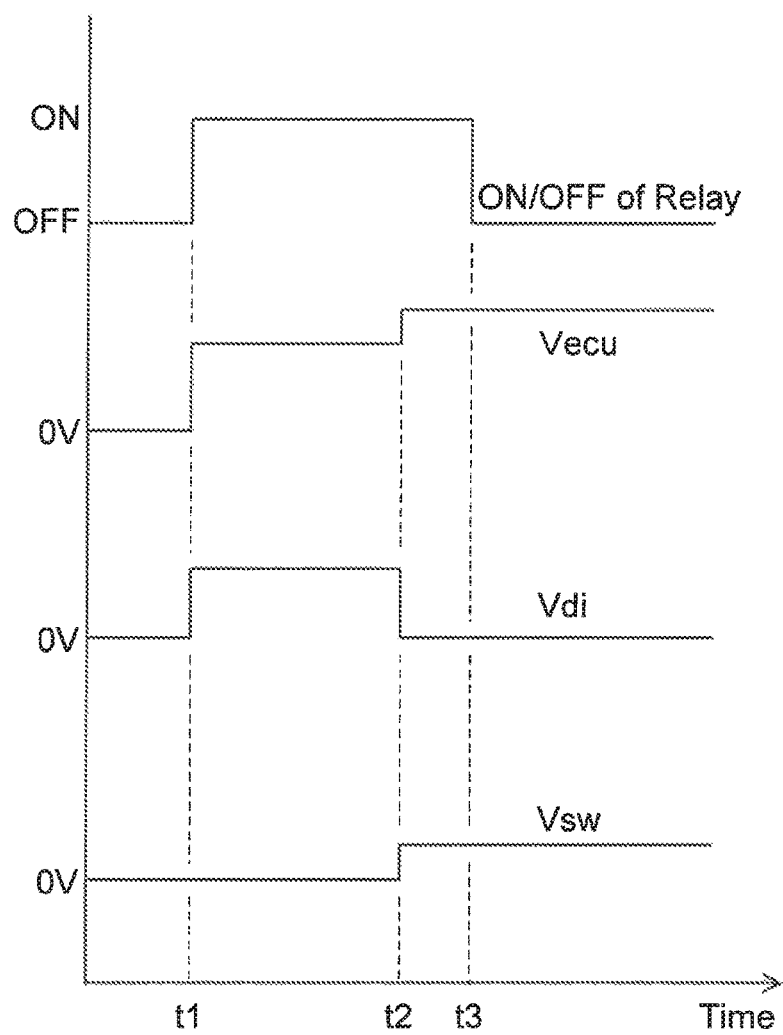
FIG. 3 is a timing diagram showing chronological changes in a state of a relay 24, a supplied voltage $V_{ecu}$ to a load 2, a voltage drop $V_{di}$ across two diodes 26, and a voltage drop $V_{sw}$ across a switching element 34, in the operation flow shown in FIG. 2.

Next, with reference to FIGS. 2 and 3, an operation of the power supply device 10 at a time of starting up the automobile will be described as a typical operation example of the power supply device 10. As shown in FIG. 2, the relay 24 is turned on (YES in S10), for example, when the user operates the start-up switch (not shown) in a driver's seat. In FIG. 3, the relay 24 is turned on at a time t1. When the relay 24 is turned on, the electric power starts to be supplied from the power source 12 to the load 2 and the controller 50 through the first power line 20. That is, the supplied voltage $V_{ecu}$, which is not zero, is applied to the load 2 and the controller 50. At this occasion, as shown in FIG. 3, a voltage drop $V_{di}$ occurs across the two diodes 26 on the first power line 20, as a result of which the supplied voltage $V_{ecu}$ is decreased by at least the voltage drop $V_{di}$ from an output voltage from the power source 12.

The controller 50 is activated by the electric power supply from the power source 12 (S12 in FIG. 2). When the activation is completed, the controller 50 determines, while maintaining the command signal to the drive circuit 40 low-level (S14), whether or not the voltage across the two diodes 26 is within a predetermined range (S16). This predetermined range can be set in advance, for example, based on the forward voltages of the two diodes 26. If the switching element 34 on the second power line 30 has been turned off in a normal manner, the electric power is supplied from the power source 12 to the load 2 through the first power line 20. At this occasion, the expected voltage drop $V_{di}$ occurs across the two diodes 26, and thus the voltage across the two diodes 26 results in being within the predetermined range. In this case (YES in 816), the controller 50 determines that the switching element 34 has been turned off in the normal manner, and proceeds to the following step (S20).

Contrary to the above, if an on-failure is occurring in the switching element 34, the electric power is supplied from the power source 12 to the load 2 only through the second power line 30, not through the first power line 20. This is because a voltage drop $V_{sw}$ which occurs in the switching element 34 (e.g., 0.25 volts) is smaller than the forward voltages of the two diodes 26 (e.g., 1.4 volts). Therefore, the current does not flow in the two diodes 26 and the voltage drop does not occur in the two diodes 26. Due to this, when the voltage across the two diodes 26 is not within the predetermined range, it can be determined that the switching element 34 is on against the command signal. In this case (NO in S16), the controller 50 determines that the on-failure is occurring in the switching element 34 (818). The controller 50 stops this start-up processing and, for example, outputs a predetermined fail signal.

If the switching element 34 operates normally (YES in 816), the controller 50 outputs the high-level command signal to the drive circuit 40 to turn on the switching element 34 (S20). In FIG. 3, it is assumed that the high-level command signal is outputted at a time t2 and the switching element 34 is turned on. When the switching element 34 is turned on, the electric power starts to be supplied to the load 2 through the second power line 30, instead of through the first power line 20. As shown in FIG. 3, the voltage drop $V_{sw}$ which occurs in the switching element 34 is smaller than the voltage drop $V_{di}$ which occurs across the two diodes 26, and thus the supplied voltage $V_{ecu}$ to the load 2 rises.

When the supplied voltage V=rises by at least a predetermined amount (S22 in FIG. 2), the controller 50 determines that the switching element 34 has been normally turned on and normally terminates the start-up processing. Contrary to this, if the supplied voltage V=e does not rise for example, it can be determined that the switching element 34 is off against the command signal. In this case (NO in S22), the controller 50 determines that an off-failure is occurring in the switching element 34 (S24). The controller 50 stops the normal start-up processing and, for example, outputs a predetermined fail signal. Thereafter, as shown in FIG. 3, the relay 24 is turned off at an arbitrary time t3. It should be noted that the aforementioned predetermined amount can be set in advance according to a difference between the expected voltage drop across the two diodes 26 and the expected voltage drop in the switching element 34, magnitude of expected noise, and the like.

As described above, the controller 50 can determine whether the switching element 34 on the second power line 30 is turned on or off based on the voltage across the two diodes 26 (i.e., the voltage drop $V_{di}$) and the supplied voltage $V_{ecu}$ to the load 2. The controller 50 can detect the on-failure and the off-failure of the switching element 34 by comparing the determined state of the switching element 34 and the command signal which the controller 50 outputs.

When the on-failure occurs in the switching element 34, the power source 12 and the load 2 cannot be electrically disconnected, and thus the electric power is unnecessarily supplied to the load 2 from the power source 12, for example. Especially when the power source 12 is a battery, the battery may run out due to unintended discharge. Further, when the off-failure occurs in the switching element 34, the power source 12 and the load 2 cannot be electrically connected, and thus the electric power cannot be steadily supplied from the power source 12 to the load 2. It should be noted that the on-failure of the switching element 34 means a failure where the switching element 34 is maintained to be on regardless of the command signal from the controller 50, and the off-failure of the switching element 34 means a failure where the switching element 34 is maintained to be off regardless of the command signal from the controller 50.

What is claimed is:

1. A power supply device for supplying electric power from a power source to a load, the power supply device comprising:
    a first power line configured to connect the power source to the load via a relay,
    at least one diode disposed on the first power line between the relay and the load;
    a second power line disposed in parallel with the first power line and configured to connect the power source to the load via a switching element; and
    a controller configured to control on and off of the switching element,
    wherein
    a voltage drop that occurs across the switching element when the switching element is turned on is smaller than a voltage drop that occurs across the at least one diode when the relay is turned on, and
    the controller is configured to determine whether the switching element is on or off based on a voltage across the at least one diode and a voltage supplied to the load.

2. The power supply device according to claim 1, further comprising a voltage measurer configured to output a signal corresponding to the voltage across the at least one diode to the controller.

3. The power supply device according to claim 2, wherein the controller is configured to determine that the switching element is off when the voltage across the at least one diode is within a predetermined range.

4. The power supply device according to claim 3, wherein the controller is configured to determine that the switching element is turned on when the voltage supplied to the load rises at least by a predetermined amount after the controller has provided the switching element with a command for turning on.

5. The power supply device according to claim 1, wherein the controller is configured to determine that the switching element is off when the voltage across the at least one diode is within a predetermined range.

6. The power supply device according to claim 5, wherein the controller is configured to determine that the switching element is turned on when the voltage supplied to the load rises at least by a predetermined amount after the controller has provided the switching element with a command for turning on.

7. The power supply device according to claim 1, wherein the controller is configured to determine that the switching element is turned on when the voltage supplied to the load rises at least by a predetermined amount after the controller has provided the switching element with a command for turning on.

* * * * *